L. RÜBSAM.
PROCESS FOR PREPARING BEER WORT.
APPLICATION FILED AUG. 27, 1904.
909,942.  Patented Jan. 19, 1909.
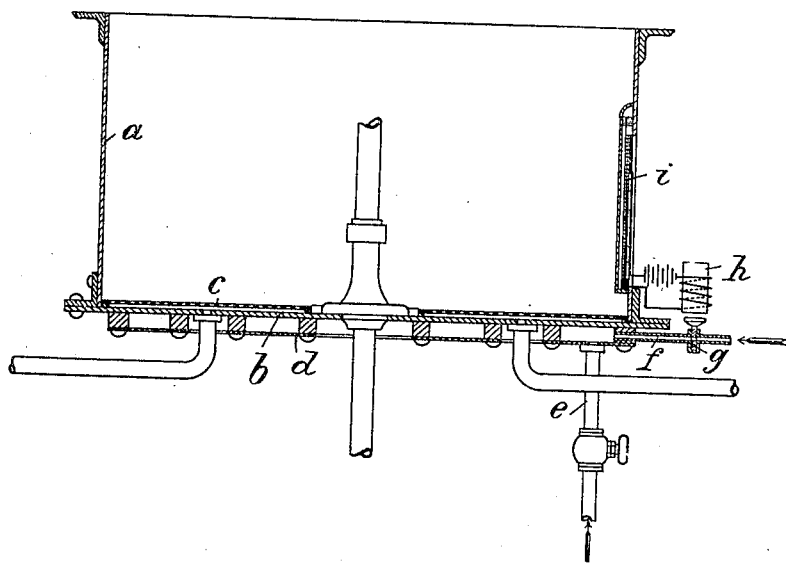
Witnesses
Inventor
Ludwig Rübsam
ATTORNEYS

UNITED STATES PATENT OFFICE.

LUDWIG RÜBSAM, OF BAMBERG, GERMANY.

PROCESS FOR PREPARING BEER-WORT.

No. 909,942.

Specification of Letters Patent.

Patented Jan. 19, 1909.

Application filed August 27, 1904. Serial No. 222,463.

*To all whom it may concern:*

Be it known that I, LUDWIG RÜBSAM, citizen of Germany, residing at Bamberg, Germany, have invented new and useful Improvements in Processes for Preparing Beer-Wort, of which the following is a specification.

My present invention relates to improvements in the art of brewing and particularly to a method of producing wort from finely ground malt or malt meal.

Heretofore, so far as I am aware, it has been extremely difficult to produce a satisfactory wort from finely ground malt, though this has long been considered desirable, and the object of the present invention is to accomplish this by a simple and inexpensive process which will not require the use of any expensive apparatus.

According to the ordinary process of brewing the conversion of the starch of the grain into maltose and dextrin is effected at a saccharifying temperature of from 167 to 172° Fahr.

The drawing off or separating of the wort begins after the mash has been permitted to preliminarily settle for from thirty to forty minutes, during which time the malt is deposited or settled.

The separating or refining of the first wort occupies a period of at least two hours, and for the sparge worts of at least three hours. During the preliminary settling the wort cools about 18° F. and during the separating or refining of the first worts there is a further cooling of about 18° F. so that the temperature towards the end of the refining of the first wort is reduced to a temperature of from about 131° to 136° F. Owing to this reduction in temperature, the speed or rate of separating or refining of the first wort is decreased, and when finely ground malt is used it often happens that the spent malt is rendered quite impermeable, and the only recourse thus far has been to cut or hack the layer of spent malt and sparge with very hot water. In order to avoid this, coarsely ground malt has been used as the spent malt resulting therefrom is not so dense and hence more permeable. I avoid these objections by my improved process according to which I prevent the cooling of the mash and wort and artificially maintain the proper temperature both during the preliminary settling and during the drawing off or separating of the first and any subsequent worts, whereby very finely ground malt may be used without its having any tendency to become compact or impervious.

For carrying out my process I may use an apparatus such as shown in the accompanying drawings in which the figure shows a clarifying or separating vat in sectional elevation.

This vat, indicated at $a$, has above its bottom $b$ a perforated false bottom $c$, and below said bottom a jacket or wall $d$ forming a space for the admission of a heating agent, such, for example, as steam or hot water, the circulation of which may be effected by pipes $e$, $f$, to maintain the requisite heat in the clarifying vat. This circulation may be regulated by a valve $g$, operated by an electro magnet $h$, the movement of which is controlled by a thermostat $i$.

Having thus described my invention, what I claim is:—

In the process of making beer wort from finely ground malt, the step which consists in maintaining during the settling and draining of the saccharified mash a continuous temperature of from 163° to 167° F. substantially as described.

In testimony whereof I have signed my name to this specification in the presence of two subscribing witnesses.

LUDWIG RÜBSAM.

Witnesses:
HEINRICH RÜBSAM,
WILLIBALD STREIBEL.